United States Patent
Banks et al.

(10) Patent No.: US 10,491,560 B2
(45) Date of Patent: *Nov. 26, 2019

(54) MESSAGE DELIVERY IN MESSAGING NETWORKS

(71) Applicant: Snap Inc., Santa Monica, CA (US)

(72) Inventors: Andrew D Banks, Romsey (GB); Gavin D Beardall, Alresford (GB); Stephen J Hobson, Hampton (GB); Ian C Vanstone, Wllington (NZ)

(73) Assignee: Snap Inc., Santa Monica, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/674,271

(22) Filed: Aug. 10, 2017

(65) Prior Publication Data

US 2017/0339094 A1   Nov. 23, 2017

Related U.S. Application Data

(63) Continuation of application No. 15/458,553, filed on Mar. 14, 2017, now Pat. No. 9,769,110, which is a
(Continued)

(30) Foreign Application Priority Data

Jan. 25, 2008   (EP) .................... 08150654

(51) Int. Cl.
 *H04L 12/58*   (2006.01)
 *H04L 12/861*   (2013.01)

(52) U.S. Cl.
 CPC ............. *H04L 51/34* (2013.01); *H04L 49/90* (2013.01); *H04L 51/04* (2013.01); *H04L 51/06* (2013.01); *H04L 51/14* (2013.01); *H04L 51/32* (2013.01)

(58) Field of Classification Search
 CPC ..................................................... H04L 12/58
 See application file for complete search history.

(56) References Cited

U.S. PATENT DOCUMENTS

| | | |
|---|---|---|
| 6,789,143 B2 | 9/2004 | Craddock et al. |
| 7,194,516 B2 | 3/2007 | Giacobbe et al. |

(Continued)

FOREIGN PATENT DOCUMENTS

| | | |
|---|---|---|
| CN | 101926138 A | 12/2010 |
| CN | 101926138 B | 8/2016 |

(Continued)

OTHER PUBLICATIONS

"U.S. Appl. No. 12/331,528, 312 Amendment filed Aug. 13, 2013", 11 pgs.

(Continued)

*Primary Examiner* — Sulaiman Nooristany
(74) *Attorney, Agent, or Firm* — Schwegman Lundberg & Woessner, P.A.

(57) ABSTRACT

In response to receipt of a request message from a requester, a reply message is created. The reply message includes a message identifier of the request message copied from the received request message. The reply message is published to each of a group of replicated message queues. The reply message is identifiable by the requester using the copied message identifier of the request message on any one of the group of replicated message queues prior to being consumed by the requester.

17 Claims, 7 Drawing Sheets

Related U.S. Application Data continuation of application No. 14/641,113, filed on Mar. 6, 2015, now Pat. No. 9,647,972, which is a continuation of application No. 14/047,667, filed on Oct. 7, 2013, now Pat. No. 9,021,038, which is a continuation of application No. 12/331,528, filed on Dec. 10, 2008, now Pat. No. 8,595,301.

(56) References Cited

U.S. PATENT DOCUMENTS

| | | | |
|---|---|---|---|
| 7,567,965 | B2 | 7/2009 | Giacobbe et al. |
| 7,979,497 | B2 | 7/2011 | Hawkins |
| 8,595,301 | B2 | 11/2013 | Banks et al. |
| 9,021,038 | B2 | 4/2015 | Banks et al. |
| 9,647,972 | B2 | 5/2017 | Banks et al. |
| 9,769,110 | B2 | 9/2017 | Banks et al. |
| 2002/0087704 | A1 | 7/2002 | Chesnais et al. |
| 2003/0182464 | A1 | 9/2003 | Hamilton et al. |
| 2005/0033841 | A1 | 2/2005 | Mccarthy et al. |
| 2005/0228867 | A1* | 10/2005 | Osborne .................. H04L 51/30 709/206 |
| 2006/0089931 | A1 | 4/2006 | Giacobbe et al. |
| 2007/0130313 | A1* | 6/2007 | King ................... H04L 67/2819 709/223 |
| 2007/0180075 | A1 | 8/2007 | Chasman et al. |
| 2008/0140720 | A1 | 6/2008 | Six et al. |
| 2015/0180813 | A1 | 6/2015 | Banks et al. |
| 2017/0187672 | A1 | 6/2017 | Banks et al. |

FOREIGN PATENT DOCUMENTS

| | | |
|---|---|---|
| EP | 2248311 | 11/2010 |
| EP | 2248311 B1 | 11/2018 |
| JP | 2011511976 A | 4/2011 |
| KR | 100259419 B1 | 6/2000 |
| KR | 1020100103594 A | 9/2010 |
| WO | WO-9707617 A1 | 2/1997 |
| WO | WO-2005025155 A1 | 3/2005 |
| WO | WO-2009092676 A1 | 7/2009 |

OTHER PUBLICATIONS

"U.S. Appl. No. 12/331,528, Applicant's Summary of Examiner Interview filed Jul. 13, 2012", 2 pgs.
"U.S. Appl. No. 12/331,528, Decision on Pre-Appeal Brief Request dated May 24, 2013", 2 pgs.
"U.S. Appl. No. 12/331,528, Examiner Interview Summary dated Aug. 8, 2012", 2 pgs.
"U.S. Appl. No. 12/331,528, Final Office Action dated Jan. 13, 2011", 13 pgs.
"U.S. Appl. No. 12/331,528, Final Office Action dated Feb. 1, 2013", 12 pgs.
"U.S. Appl. No. 12/331,528, Non Final Office Action dated Mar. 22, 2012", 11 pgs.
"U.S. Appl. No. 12/331,528, Non Final Office Action dated Aug. 27, 2012", 11 pgs.
"U.S. Appl. No. 12/331,528, Non Final Office Action dated Sep. 17, 2010", 11 pgs.
"U.S. Appl. No. 12/331,528, Notice of Allowance dated Jul. 15, 2013", 14 pgs.
"U.S. Appl. No. 12/331,528, Pre-Brief Conference request filed May 1, 2013", 7 pgs.
"U.S. Appl. No. 12/331,528, Response filed Mar. 23, 2011 to Final Office Action dated Jan. 13, 2011", 18 pgs.
"U.S. Appl. No. 12/331,528, Response filed Jun. 15, 2012 to Non Final Office Action dated Mar. 22, 2012", 16 pgs.
"U.S. Appl. No. 12/331,528, Response filed Jun. 27, 2013 to Decision on Pre-Appeal Brief Request dated May 24, 2013", 20 pgs.
"U.S. Appl. No. 12/331,528, Response filed Nov. 27, 2012 to Non Final Office Action dated Aug. 27, 2012", 15 pgs.
"U.S. Appl. No. 12/331,528, Response filed Dec. 13, 2010 to Non Final Office Action dated Sep. 17, 2010", 19 pgs.
"U.S. Appl. No. 12/359,920, Non Final Office Action dated Oct. 12, 2010", 10 pgs.
"U.S. Appl. No. 12/359,920, Notice of Allowance dated Mar. 4, 2011", 9 pgs.
"U.S. Appl. No. 14/047,667, Non Final Office Action dated Jul. 29, 2014", 10 pgs.
"U.S. Appl. No. 14/047,667, Notice of Allowance dated Dec. 22, 2014", 12 pgs.
"U.S. Appl. No. 14/047,667, Response filed Oct. 27, 2014 to Non Final Office Action dated Jul. 29, 2014", 19 pgs.
"U.S. Appl. No. 14/641,113, Examiner Interview Summary dated Jul. 14, 2016", 3 pgs.
"U.S. Appl. No. 14/641,113, Final Office Action dated Oct. 6, 2016", 14 pgs.
"U.S. Appl. No. 14/641,113, Non Final Office Action dated May 10, 2016", 12 pgs.
"U.S. Appl. No. 14/641,113, Notice of Allowance dated Jan. 5, 2017", 13 pgs.
"U.S. Appl. No. 14/641,113, Response file Jul. 14, 2016 to Non Final Office Action dated May 10, 2016", 14 pgs.
"U.S. Appl. No. 14/641,113, Response filed Nov. 23, 2016 to Final Office Action dated Oct. 6, 2016", 17 pgs.
"U.S. Appl. No. 15/458,553, Notice of Allowance dated May 25, 2017", 15 pgs.
"U.S. Appl. No. 15/458,553, Preliminary Amendment filed Apr. 3, 2017", 8 pgs.
"Chinese Application Serial No. 200980103028.5, Office Action dated May 14, 2012", w/ English Translation, 10 pgs.
"Chinese Application Serial No. 200980103028,5, Office Action dated Dec. 24, 2015", w/ English Translation, 6 pgs.
"Chinese Application Serial No. 200980103028.5, Response filed Mar. 8, 2016 to Office Action dated Dec. 24, 2015", (English Translation of Claims), 14 pgs.
"European Application Serial No. 09704583.5, Communication Pursuant to Article 94(3) EPC dated Apr. 11, 2016", 6 pgs.
"European Application Serial No. 09704583.5, Communication Pursuant to Article 94(3) EPC dated Jul. 10, 2015", 4 pgs.
"European Application Serial No. 09704583.5, Response filed Jan. 4, 2016 to Communication Pursuant to Article 94(3) EPC dated Jul. 10, 2015", 13 pgs.
"European Application Serial No. 09704583.5, Response filed Sep. 13, 2016 to Communication Pursuant to Article 94(3) EPC dated Apr. 11, 2016", 10 pgs.
"European Application Serial No. 09704583.5, Summons to Attend Oral Proceedings dated Mar. 9, 2017", 3 pgs.
"International Application Serial No. PCT/EP2009/050523, International Preliminary Report on Patentability dated Aug. 5, 2010", 7 pgs.
"International Application Serial No. PCT/EP2009/050523, International Search Report dated May 8, 2009", 3 pgs.
"International Application Serial No. PCT/EP2009/050523, Written Opinion dated May 8, 2009", 5 pgs.
"European Application Serial No. 09704583.5, Response filed Apr. 16, 2018 to Summons to Attend Oral Proceedings dated Mar. 9, 2017", w/ Main, Auxiliary and Second Auxiliary English Claims, 24 pgs.
U.S. Appl. No. 12/331,528 now U.S. Pat. No. 8,595,301, filed Dec. 10, 2008, Message Delivery in Messaging Networks.
U.S. Appl. No. 14/047,667 now U.S. Pat. No. 9,021,038, filed Oct. 7, 2013, Message Delivery in Messaging Networks.
U.S. Appl. No. 14/641,113 now U.S. Pat. No. 9,647,972, filed Mar. 6, 2015, Message Delivery in Messaging Networks.
U.S. Appl. No. 15/458,553 now U.S. Pat. No. 9,769,110, filed Mar. 14, 2017, Message Delivery in Messaging Networks.

* cited by examiner

MESSAGE DELIVERY IN MESSAGING NETWORKS

PRIORITY

This application is a continuation of and claims the benefit of priority to U.S. Ser. No. 15/458,553, filed Mar. 14, 2017 which is a continuation of and claims the benefit of priority to U.S. Ser. No. 14/641,113, filed Mar. 6, 2015, which is a continuation of and claims the benefit of priority to U.S. Ser. No. 14/047,667, filed Oct. 7, 2013, which is a continuation of and claims the benefit of priority to U.S. Ser. No. 12/331,528, filed Dec. 10, 2008, which claims priority to the European Patent Application 08150654.5, filed Jan. 25, 2008, each of which are hereby incorporated by reference in their entirety.

BACKGROUND

This invention relates to the field of message delivery in messaging networks. In particular, the invention relates to message delivery of messages that can be uniquely identified by the consumer before being consumed.

An example of a message that can be uniquely identified before being consumed is a reply message in a request/reply system. Within a messaging network requesters send requests and receive replies, and responders receive requests and send replies.

A level of high availability may be achieved at the front end of the messaging network by providing a plurality of message managing systems to which requesters connect and using a workload balancing mechanism that routes requester connections to available message managing systems. The backend may also be made more available by providing a plurality of message managing systems to which responders can connect and using a workload balancing mechanism on the front end message managing systems that routes request messages to available backend message managing systems. Requests may continue to be processed even if a front or backend messaging manager system is unavailable.

The overall problem is the availability issue associated with the routing of replies when affinities exist. Replies are typically routed by a backend messaging manager system to a particular front end messaging manager system and not workload balanced. The front end messaging manager system used is that through which the corresponding request message was sent. This is because requesters typically send a request and remain connected to the same messaging manager system until they received the corresponding reply. There is an affinity created between the reply and the front end messaging manager system. This creates a problem for the availability of a reply at the front end because the completion of the requester's work (send request, receive reply) is dependent on the continued availability of the messaging manager system from which it sent the request. If the messaging manager system fails after the request is routed to the backend and before the reply is routed to the front end, then the reply is held at the backend until the front end messaging manager system becomes available.

A further problem exists if the requester disconnects or is disconnected from a front end messaging manager system after it sends a request, but before the reply is received. Requester connections are workload balanced. So when the requester re-connects (for the purpose of receiving the reply), its connection could be workload balanced to a different front end messaging manager system to which it was originally connected. This results in a situation where the reply is unavailable to the requester until it re-connects to the correct front end messaging manager system.

One known solution to this problem is to use separate connection logic for requesters depending on their state. Before sending a request, the connection is workload balanced and after sending a request, but before receiving the reply, the connection is not workload balanced, but made to the messaging manager system with which the requester has an affinity.

BRIEF SUMMARY

According to a first aspect of the present invention there is provided a method for message delivery in messaging networks, comprising: creating a message including a unique identifier; and sending the message to each of a plurality of replicated queues, where the message is identifiable by the unique identifier prior to being consumed.

According to a second aspect of the present invention there is provided a system for message delivery in a messaging network, comprising: a messaging network including a plurality of message managing systems provided on one or more processors; a plurality of replicated queues for messages which are operable to be identified by an application before a message is read, the plurality of replicated queues being defined in association with the plurality of message managing systems; where the message is sent to each of the plurality of replicated queues to be accessible using any one of the plurality of message managing systems.

According to a third aspect of the present invention there is provided an apparatus for message delivery in a messaging network comprising a plurality of message managing systems provided on one or more processors; the apparatus including: means for creating a message comprising a unique identifier, and means for sending the message to each of a plurality of replicated queues, where the message is identifiable by the unique identifier prior to being consumed.

According to a fourth aspect of the present invention there is provided a computer program product stored on a computer readable storage medium for message deliver in messaging networks, comprising computer readable program code means for performing the steps of: creating a message including a unique identifier; and sending the message to each of a plurality of replicated queues with the reply message identifiable by the unique identifier prior to being consumed.

Two parts to the solution are:
1) Replies are replicated so that instead of one reply being sent to a specific front end messaging manager system, a reply is sent to all front end message managing systems.
2) Requesters may connect to any front end messaging manager system to receive reply messages. Reply messages on the other front end message managing systems are deleted automatically.

As such, the invention may increase availability of replies to requesters by removing the requirement for requesters to receive replies from the same messaging manager system from which they sent the request. The invention also removes the requirement for separate connection logic in requesters, allowing them to be workload balanced to available message managing systems regardless of the requester's state, and to receive replies at any front end messaging manager system.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
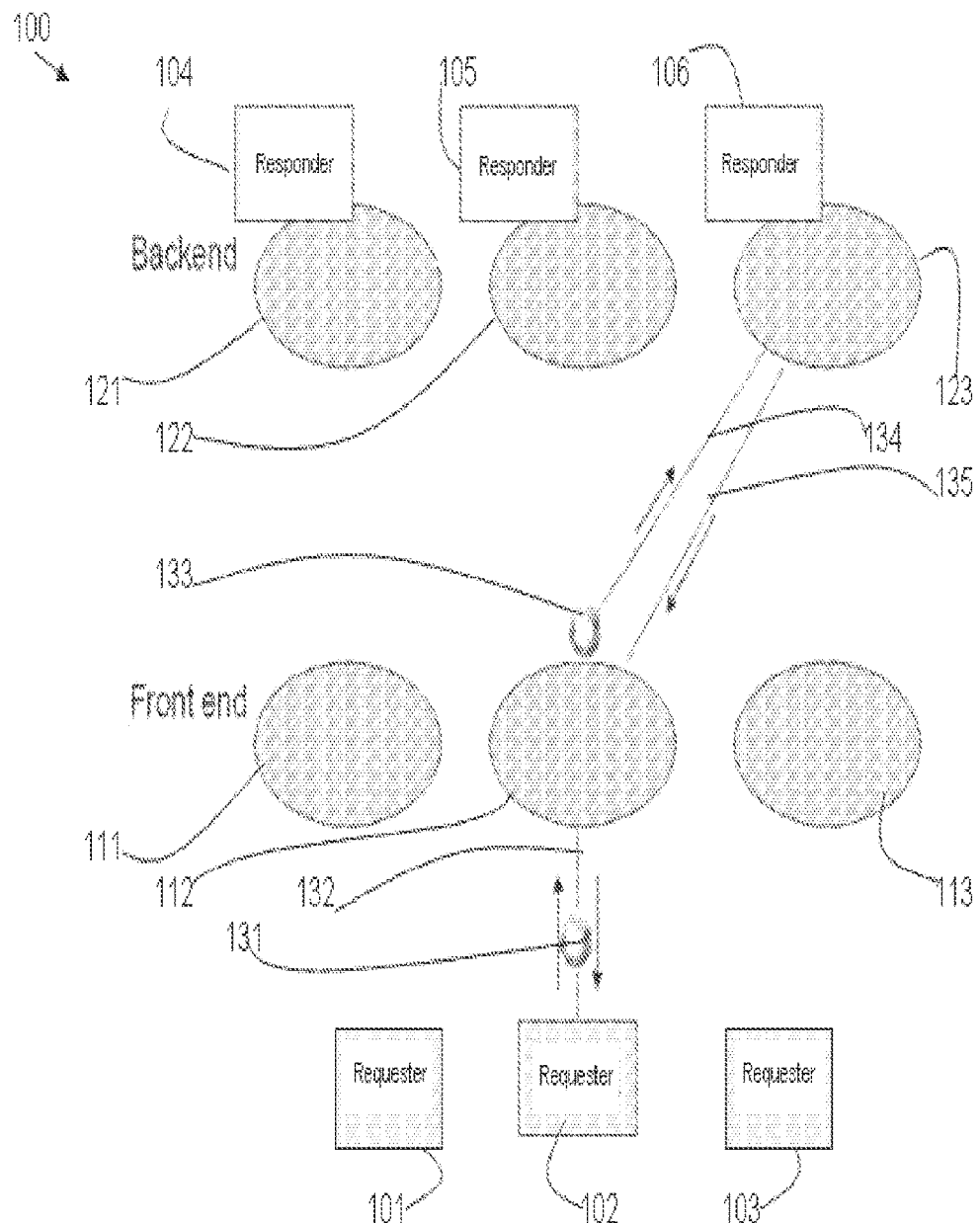
FIG. 1 is a schematic diagram of a messaging system as known in the prior art.

Referring to FIG. 1, a messaging network system 100 is shown as known in the prior art. Within the messaging network system 100, requesters 101-103 (send request, receive reply) and responders 104-106 (receive request, send reply) may be connected to separate message managing systems 111-113, 121-123. The messaging network system 100 uses front end messaging manager system 111-113 for requester 101-103 connections and backend message managing systems 121-123 for responder 104-106 connections. Message managing systems 111-113, 121-123 may be, for example, queue managers.

A level of high availability may be achieved at the front end of the messaging network by providing several front end message managing systems 111-113 to which requesters 101-103 may connect and using a workload balancing mechanism 131 (e.g. IP load balancer or messaging manager system feature) that routes requester connections to available message managing systems 111-113. For example, in FIG. 1 a channel 132 is shown from a requester 102 to the messaging managing system 112 (selected by workload balancing) through which messages flow.

The backend may be made more available by providing several message managing systems 121-123 to which responders 104-106 may connect. A workload balancing mechanism 133 on the front end message managing systems 111-113 routes requests to available backend messaging managing systems 121-123. For example, FIG. 1 shows a request 134 routed to the backend messaging managing system 123 and a reply 135 routed to the front end messaging managing system 112.

The messaging network system 100 may continue to process requests, by sending requests from the requester 101 through the front end and backend messaging managing systems 111-113, 121-123 to a responder 106, even if one or more of the front or backend messaging managing systems is unavailable.

Figure 2:
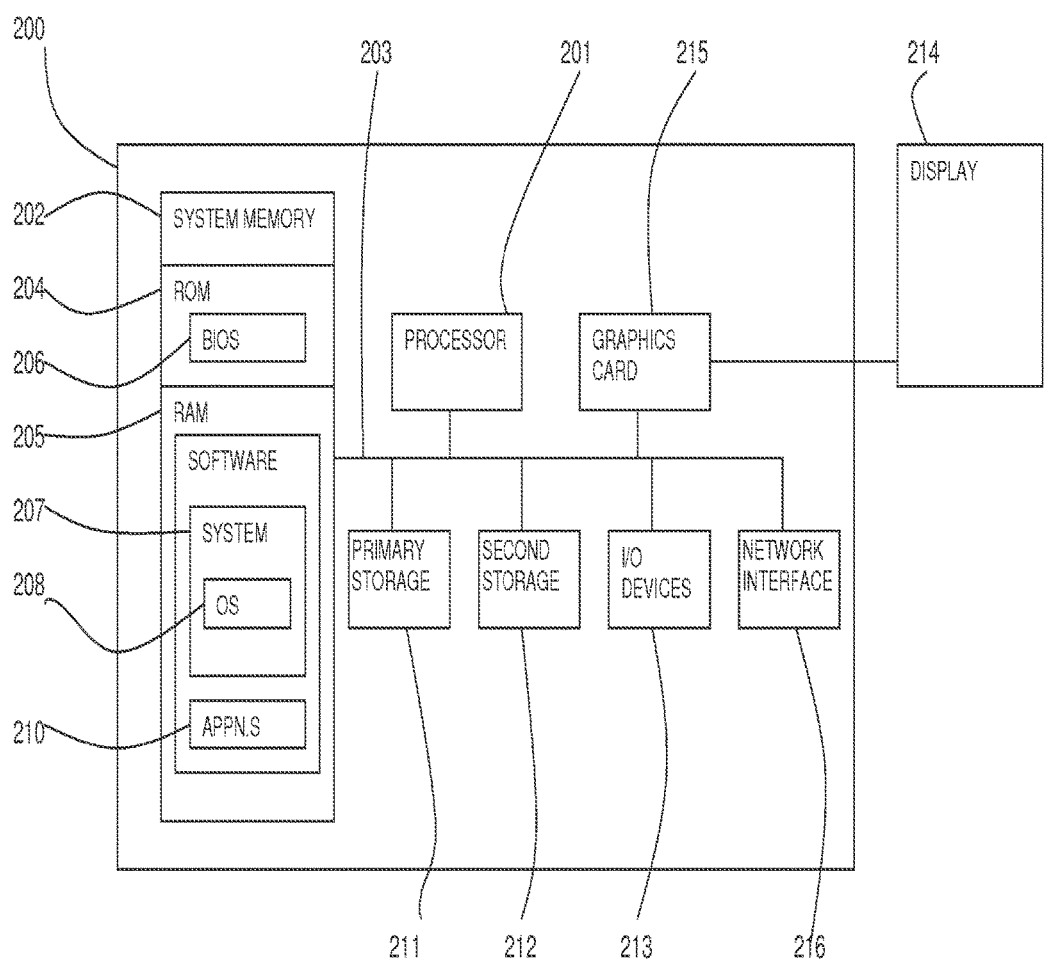
FIG. 2 is a block diagram of a computer system in which the present invention may be implemented.

Referring to FIG. 2, an exemplary system in which a messaging manager system in accordance with the present subject matter may be implemented includes a data processing system 200 suitable for storing and/or executing program code including at least one processor 201 coupled directly or indirectly to memory elements through a system bus 203. The memory elements may include local memory employed during actual execution of the program code, bulk storage, and cache memories which provide temporary storage of at least some program code in order to reduce the number of times code must be retrieved from bulk storage during execution.

The memory elements may include a system memory 202 in the form of a read only memory (ROM) 204 and a random access memory (RAM) 205. A basic input/output system (BIOS) 206 may be stored in the ROM 204. System software 207 may be stored in the RAM 205 including operating system software 208. Software applications 210 may also be stored in the RAM 205.

The data processing system 200 may also include a primary storage means 211, such as a magnetic hard disk drive, and a secondary storage means 212, such as a magnetic disc drive and an optical disc drive. The drives and their associated computer-readable media provide non-volatile storage of computer-executable instructions, data structures, program modules and other data for the data processing system 200. Software applications may be stored on the primary and secondary storage means 211, 212 as well as the system memory 202.

The data processing system 200 may operate in a networked environment using logical connections to one or more remote computers via a network interface 216.

Input/output (I/O) devices 213 may be coupled to the system either directly or through intervening I/O controllers. A user may enter commands and information into the data processing system 200 through input devices such as a keyboard, pointing device, or other input devices (for example, microphone, joy stick, game pad, satellite dish, scanner, or the like). Output devices may include speakers, printers, etc. A display device 214 may also be connected to the system bus 203 via an interface, such as a video adapter graphics card 215.

A messaging manager system includes a program defining a registry, a messaging manager system definition, and local default queue definitions.

In the described method and system, a special type of queue is provided which is used to hold messages. This queue is referred to as a replicated queue (RQ). RQs are designed for messages that may be uniquely identified by consumers before those consumers have received the message (e.g. reply messages with unique identifier).

RQs are defined on a plurality of message managing systems, either using a manual definition on every messaging manager system or using one manual definition and an auto-definition mechanism to replicate the definition on other message managing systems. Using an auto-definition mechanism supports dynamic creation of RQs (e.g. those defined in response to application activity). Message managing systems in the messaging network are automatically made aware of the RQs in the messaging network.

When a message is sent to an RQ (e.g. a reply message) it has a unique identifier. The unique identifier may be specified by an application or by the messaging manager system. Either the messaging manager system or an application replicates the message so that every messaging manager system in the messaging network that hosts the RQ receives a copy. The replicated messages are sent using any messaging technology.

Each messaging manager system that hosts the RQ receives a copy of the replicated message. Applications may connect to any of the message managing systems hosting the RQ to receive their messages (identified by a unique identifier).

Once an application has consumed (e.g., processed) one of the replicated messages it has completed its work, but the other message managing systems that host the RQ still hold copies of the message. These remaining messages use system resources and may therefore be deleted. It is advantageous for this deletion to be carried out automatically.

When the message is consumed by an application, the messaging manager system sends a notification message to all other message managing systems which host the RQ. The notification messages are sent using any messaging technology.

This notification message contains both the name of the RQ to which the reply was sent and the unique identifier of the consumed message. This notification message is delivered to a message deletion component. This component may be an external program or part of the messaging system.

When the message deletion component receives a notification message it deletes the uniquely specified message from the specified RQ. Reply messages on the other RQs may exist for some time after an application has received its message. It is acceptable for these messages to remain on RQs because their existence does not affect other applications. This is because applications consume messages using a unique identifier, and the identifier of these messages does not match that used by other applications.

It is possible for the message deletion component to receive a notification message before the corresponding replicated message arrives on the RQ, therefore notification messages, for which the corresponding replicated message is unavailable, are retained. When the corresponding replicated message arrives, both it and the retained notification message are deleted.

It is possible that either the notification message or the replicated message do not reach a specific messaging manager system. For instance where communications links between message managing systems are down or messages expire. Notifications may have the same expiration as the replicated message.

In summary, the following procedures are undertaken:
When a message is sent to an RQ, message managing systems local to the sender replicate the message to every instance of the RQ.
When a replicated message is received by an application, the other replicas held on RQs are automatically deleted.

The following examples explain how RQs may be used for sending replies.

Figure 3A:
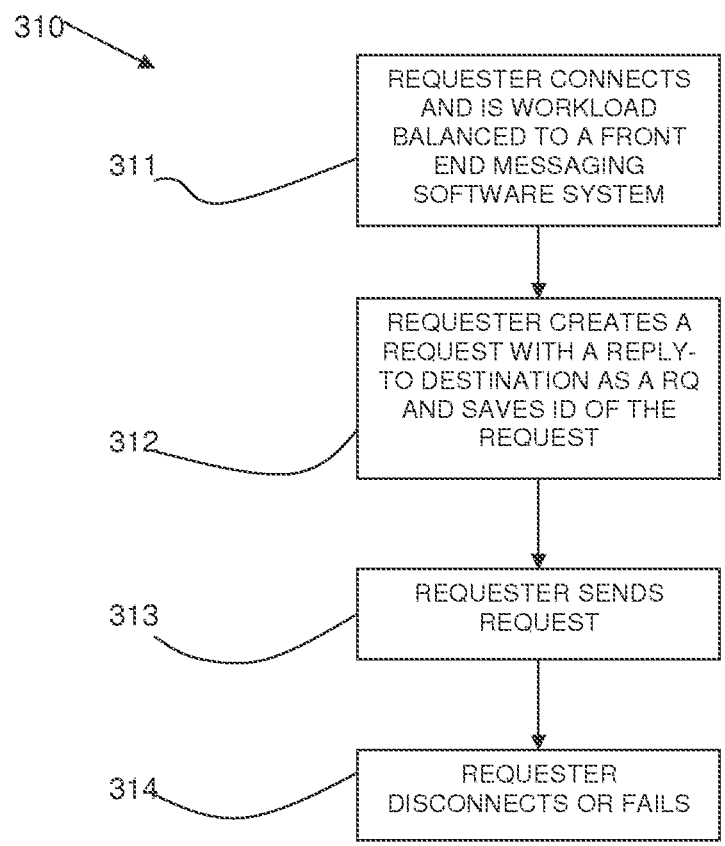
FIG. 3A is a flow chart of processing carried out by a requester in accordance with aspects of the present invention.

Referring to FIG. 3A, a flow diagram 310 shows the process steps carried out by a requester. A requester connects 311 to a messaging network and is workload balanced to a particular front end messaging manager system. The requester creates 312 a request with a reply-to destination as an RQ and saves the identifier of the request. The requester sends 313 the request. The requester may then disconnect, or the connection may fail 314.

The messaging network workload balancing mechanism executes and chooses a backend messaging manager system to which the request is sent.

Figure 3B:
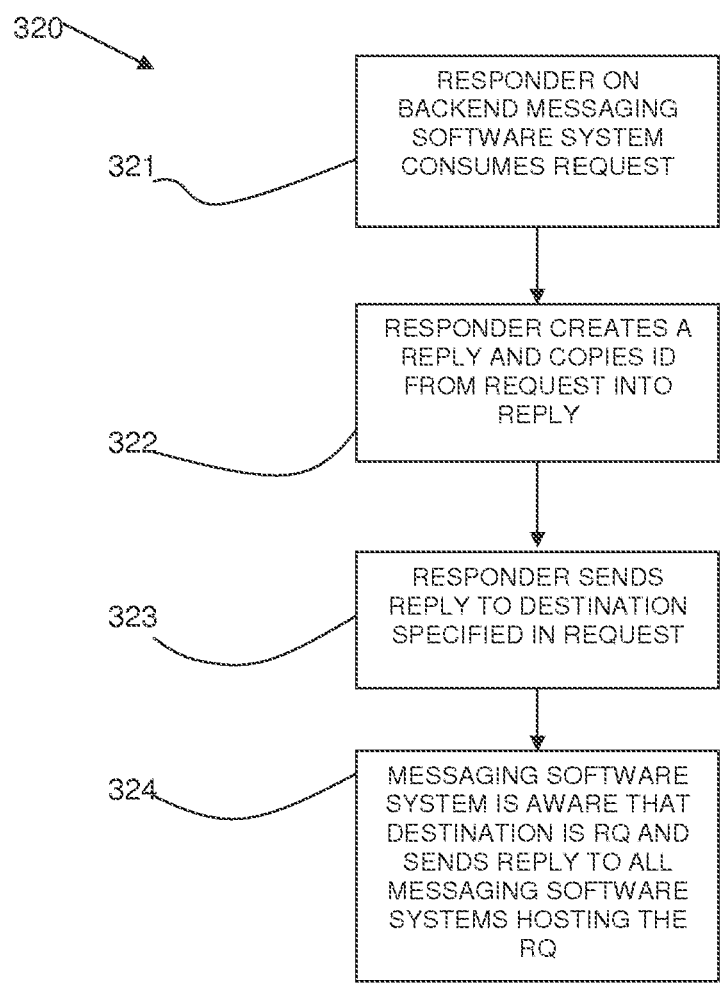
FIG. 3B is a flow chart of processing carried out by a responder in accordance with aspects of the present invention.

Referring to FIG. 3B, a flow diagram 320 shows the process steps carried out by a responder, connected to a backend messaging manager system, to which a request is sent. The responder consumes 321 the requests. The responder creates 322 a reply and copies the identifier from the request into the reply. The responder sends 323 the reply to the destination specified in the request. The messaging manager system is aware that the specified destination is an RQ and sends 325 the reply to all message managing systems which host the RQ.

Figure 3C:
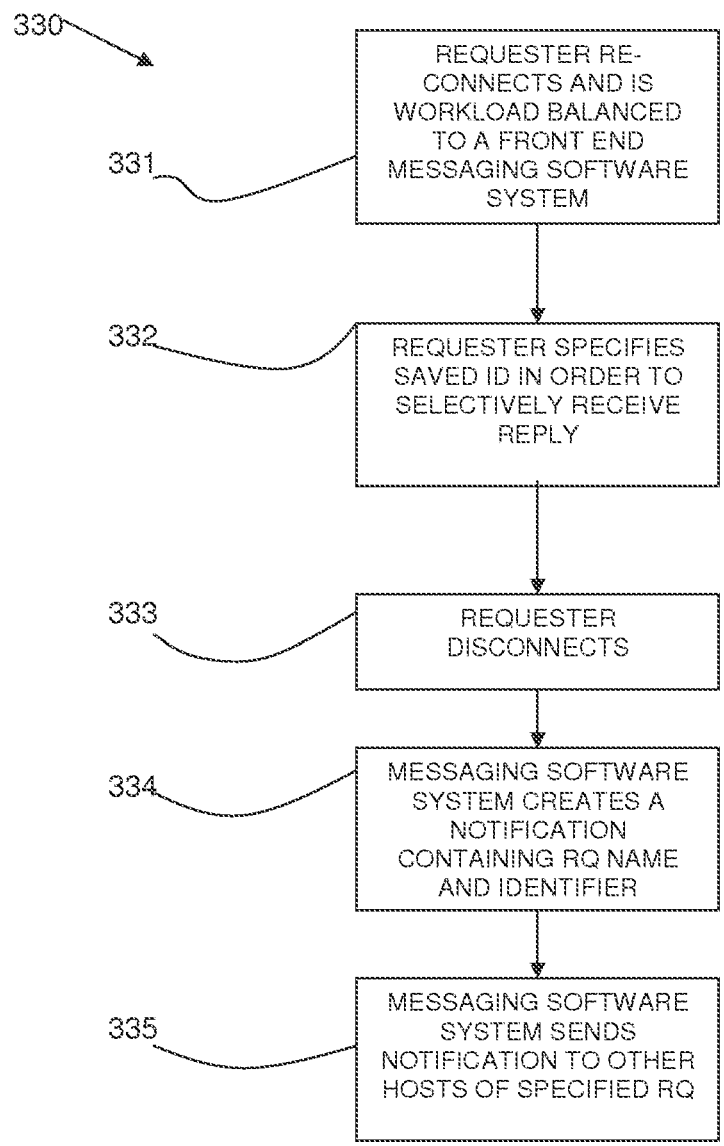
FIG. 3C is a flow chart of processing carried out by a requester when it re-connects in accordance with aspects of the present invention.

Referring to FIG. 3C, a flow diagram 330 shows the process steps carried out by a requester when it re-connects. The requester re-connects 331 and is workload balanced to any one of the front end message managing systems. The requester specifies the saved identifier from the request in order to selectively receive 332 the reply and disconnects 333. When the messaging manager system delivers the reply to the requester, it creates 334 a notification message containing the name of the RQ and the identifier of the reply that has been consumed. The messaging manager system sends 335 the notification message to the other hosts of the specified RQ. The deletion notification component deletes the specified reply.

Figure 4A:
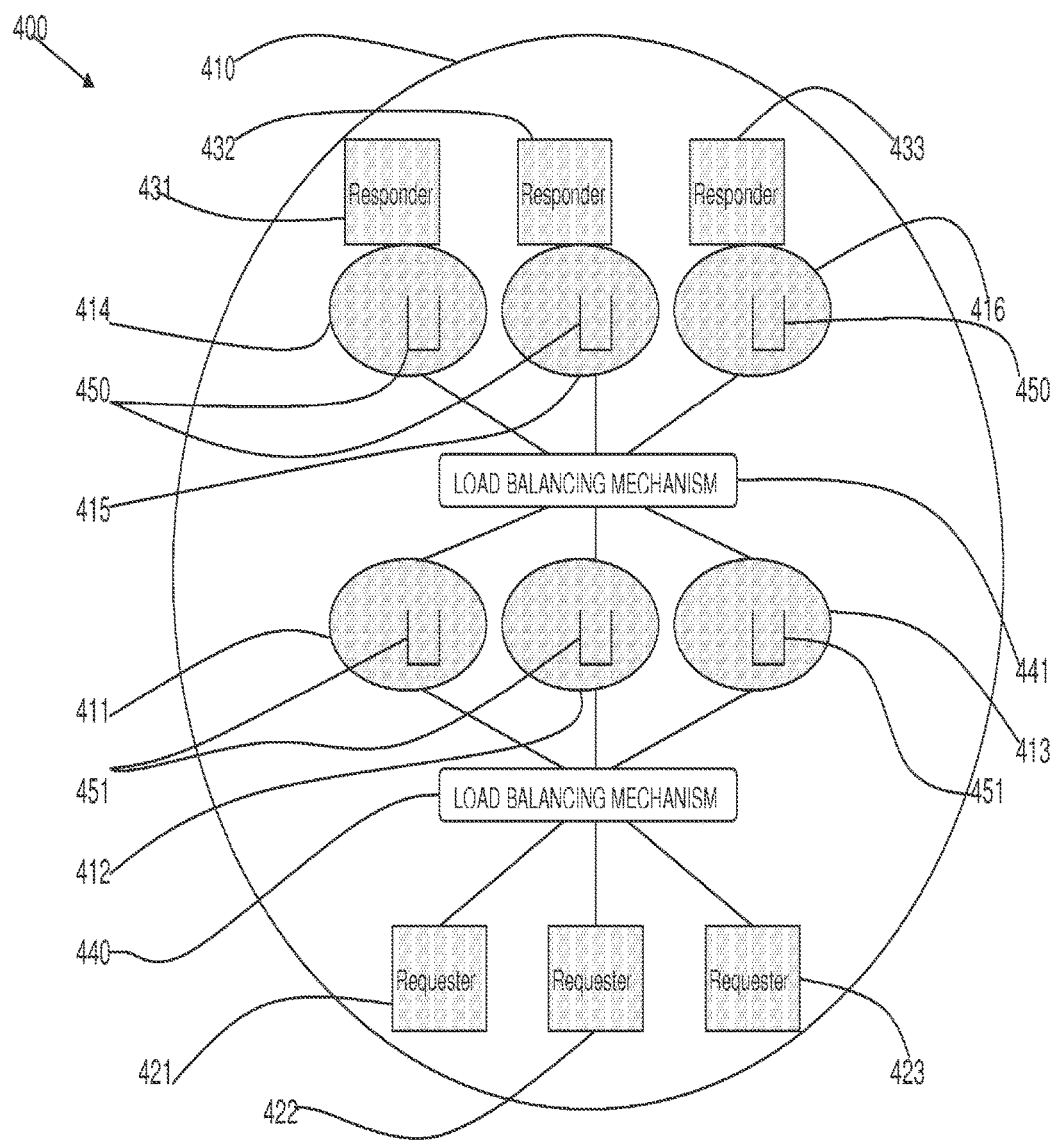
FIG. 4A is a block diagram of a system in accordance with the present invention.

A system diagram is shown in FIG. 4A of a messaging system 400 with a messaging network 410 with front end message managing systems 411-413 and backend message managing systems 414-416. Requester connections 421-423 are load balanced via a load balancing mechanism 440 to one of the front end message managing systems 411-413. A second load balancing mechanism 441 load balances requests from the front end message managing systems 411-413 to the backend message managing systems 414-416. Responders 431-433 are connected to the backend message managing systems 414-416.

The backend message managing systems 414-416 each host an RQ 450 and the front end message managing systems 411-413 each host an RQ 451.

In one embodiment, RQs may be implemented as a special type of cluster queue. An example implementation is described in the context of and sold under the trademark WEBSPHERE MQ clusters (WebSphere MQ is a trademark of International Business Machines Corporation). A messaging network may be provided in the form of queue managers in a WebSphere MQ cluster, with queue managers in the cluster being automatically made aware of the RQs in the cluster. When a message consumer creates a reply message, it copies information from the request message into the reply message by copying MQMD.MsgId to MQMD.CorrelId to allow message producers to correlate requests and replies. The message consumer that originally put the request either remains connected or re-connects to any of the front end queue managers and receives the reply message held on the RQ on that queue manager. The application uses the correlation information of the MQMD.CorrelId in order to receive the specific reply message it is interested in.

Figure 4B:
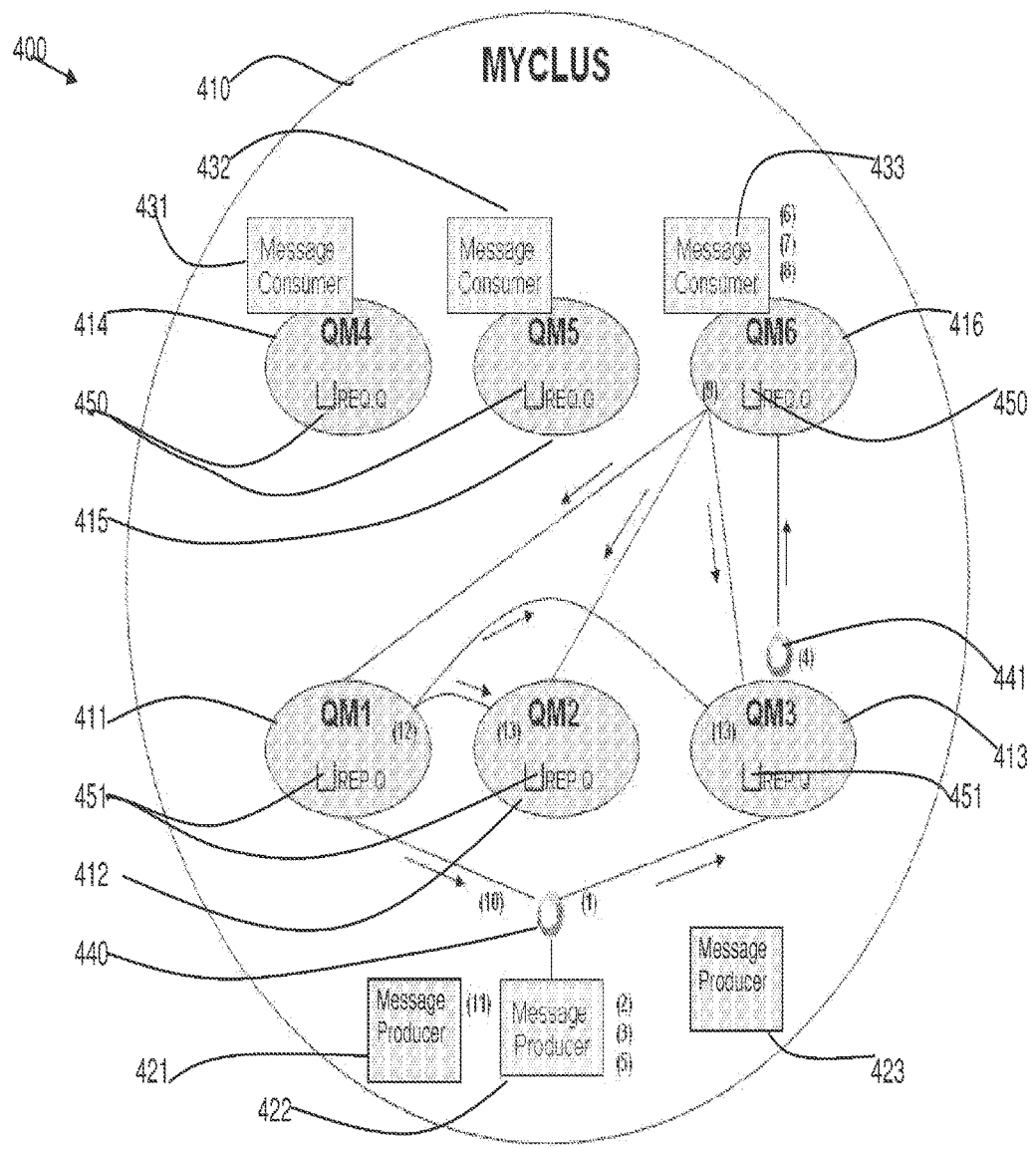
FIG. 4B is a block diagram of an embodiment of a system illustrating a message flow in accordance with the present invention.

Referring to FIG. 4B, the messaging system 400 of FIG. 4A is shown in the context of a WebSphere MQ cluster 410 (MYCLUS) of message managing systems in the form of queue managers 411-416. Three backend queue managers 414-416 (QM4, QM5 and QM6) and three front end queue managers 411-413 (QM1, QM2 and QM3) are shown. Message producer client applications 421-423 connect via a load sharing mechanism 440 to one of the front end queue managers 411-413, put a request message to a cluster queue 450 (REQ.Q) hosted on all the backend queue managers 414-416 and then disconnect. The message consumer applications 431-433 connected to the backend queue managers 414-416, get request messages from the cluster queue 450 (REQ.Q), and put reply messages to a RQ queue 451 (REP.Q). Each front end queue manager 411-413 has a RQ queue 451 (REP.Q). The reply message may be retrieved from any of the front end queue managers 411-413.

The request queues are created as follows:
!QM4 DEF QL(REQ.Q) CLUSTER(MYCLUS)
!QM5 DEF QL(REQ.Q) CLUSTER(MYCLUS)
!QM6 DEF QL(REQ.Q) CLUSTER(MYCLUS)
The reply queues are created as follows:
!QM1 DEF RQ(REP.Q) CLUSTER(MYCLUS)
!QM2 DEF RQ(REP.Q) CLUSTER(MYCLUS)
!QM3 DEF RQ(REP.Q) CLUSTER(MYCLUS)

Note that once an RQ is defined, the queue manager on which it is defined automatically subscribes for information related to the queue (i.e. notification messages).

The following steps (referenced in FIG. 4B) explain the behaviour for a single request and reply.

1) The message producer client application connects and is workload balanced (e.g. using an IP load balancer or the WebSphere MQ client channel definition table) to a particular front end queue manager. In this case it is workload balanced to QM3.
2) The message producer client application creates a request message, fills in a MQMD.ReplyToQ name of REP.Q and saves the MQMD.MsgId.
3) The message producer client application puts the request message to REQ.Q. As REQ.Q is a cluster queue QM3 is aware of it and may route messages to it.
4) The cluster workload balancing algorithm is executed and in this case chooses to send the request message to QM6. The message is sent over cluster channels to QM6 and put on REQ.Q.
5) The message producer client application disconnects (or connection fails). Note, this may actually happen at any point between step 3 and step 10.
6) The message consumer application on QM6 gets and processes (e.g. database update) the request message.
7) The message consumer application on QM6 creates the reply message and copies the MQMD.MsgId from the request message into the MQMD.CorrelId in the reply message.
8) The message consumer application on QM6 puts the reply message to the destination specified in the MQMD.ReplyToQ of the request message (REP.Q).
9) QM6 is aware that REP.Q is an RQ and so ignores any MQOD.ObjectQMgrName specified and publishes the reply message to all queue managers that host REP.Q, so that a copy of the reply message now exists on REP.Q on QM1, QM2 and QM3. Note that ignoring the ObjectQMgrName allows existing applications to take advantage of RQs.
10) The message producer client application connects and is workload balanced (e.g. using either an IP load balancer or the WebSphere MQ client channel definition table) to a particular front end queue manager. In this case it is workload balanced to QM1.
11) The message producer client application specifies the saved message ID (from the request message) in the reply message MQMD.CorrelId, gets the reply message, and disconnects.
12) QM1 notices that a reply message has been removed from the RQ (REP.Q) and automatically creates a notification message containing the name of the RQ (REP.Q) and the CorrelId of the reply message that has just been removed (i.e. the same CorrelId that is in the other reply messages on the other RQs). QM1 then publishes the notification to the other hosts of REP.Q, which are already subscribing for these notifications.
13) QM2 and QM3 get the publication and use the information in the notification message to delete the specified message from the specified RQ (REQ.Q). Note that QM1 does not receive the notification as local deliveries are not in effect.

As with all application connections, there is a window where, if the connection fails during commit, the application cannot be sure if the commit completed or not. The following scenarios describe two problem commits.

1) The application issues a commit call, the commit fails, the connection fails, and the application receives a "connection broken" return code from the commit call. The reply is still available.
2) The application issues a commit call, the commit completes successfully, the connection fails, and the application receives a "connection broken" return code from the commit call. The reply is no longer available.

The problem in scenarios 1) and 2) is that the application does not know if the commit actually completed or not. The same problem exists with all applications that commit. The solution is that the application (being the sole consumer of the individual message) may assume the commit worked if the message is no longer available from the messaging manager system. There are two example solutions:

a) If the application receives a "connection broken" in response to a commit call, the application may reconnect to the same messaging manager system to which it issued the commit and check for the reply. If the reply does not exist, it may be assumed that the commit succeeded and the application may continue processing. If the reply exists, it may be consumed again and committed again. Although this creates an affinity, the "affinity window" is much reduced when using the RQ system.
b) Ignore the error and continue with the assumption that the commit succeeded. If the commit did succeed, the reply is removed from the RQ and no more action need be taken. If the commit failed, the reply remains on the RQ. As all applications consuming replies are selecting uniquely identifiable replies, no other application may consume the remaining replies, so the problem now is how to clear up the remaining replies. Either expiration or manual clearing of RQs may be used.

This described method and system increases availability in request/reply scenarios. The solution provides availability improvements with minimal effect on message round trip time. A time increase may be associated with the sending of replicated replies if there are a very large number of hosts of the RQ because all replies are likely to be sent in one unit of work. It is worth noting that it is unlikely that a large number of RQs are required, for availability requirements at least. Also, the deletion of surplus replies is done outside any units of work associated with message round trip time.

The solution is designed so that a network containing n RQs may deliver replies in the event of the failure of up to n−1 message managing systems which host the RQ. Typically, one may expect two or three RQs to provide enough redundancy.

In certain (failure) scenarios this model produces duplicate replies that are not deleted in a timely manner. This solution assumes that the replies are selectively processed (e.g. by unique identifier). Once a reply has been consumed, the selection criteria held by the application is cleared so that the application does not attempt to read any existing duplicate replies from other RQs. If selective replies are not required, any thread or application may process replies, thus negating the need for RQs altogether (a simple destination may suffice).

The invention may take the form of an entirely hardware embodiment, an entirely software embodiment or an embodiment containing both hardware and software elements. In an embodiment, the invention is implemented in software, which includes but is not limited to firmware, resident software, microcode, etc.

The invention may take the form of a computer program product accessible from a computer-usable or computer-readable medium providing program code for use by or in connection with a computer or any instruction execution system. For the purposes of this description, a computer usable or computer readable medium may be any apparatus that may contain, store, communicate, propagate, or transport the program for use by or in connection with the instruction execution system, apparatus or device.

The medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications may be made to the foregoing without departing from the scope of the present invention.

What is claimed is:

1. A method for message delivery in messaging networks, comprising:
   creating, by a requester computing device, a request message comprising a unique message identifier;
   sending, by the requester computing device via a first one of a plurality of messaging manager systems, the request message to a second one of the plurality of messaging manager systems;
   disconnecting, by the requester computing device, from the first one of the plurality of messaging manager systems;
   wherein, in response to receiving the request message, a reply message comprising the unique message identifier is created by the second one of the plurality of messaging manager systems and is published to each of a plurality of replicated message queues, the reply message to be received by the requester computing device from any one of the plurality of replicated message queues;
   connecting, by the requester computing device, to a third one of the plurality of messaging manager systems;
   specifying, by the requester computing device, the unique message identifier of the request message to receive the reply message; and
   receiving, by the requester computing device, the reply message from one of the plurality of replicated message queues;
   wherein after the reply message is received by the requester computing device, the reply message is deleted from each of the plurality of replicated message queues, other than the one of the plurality of replicated message queues, based on receiving a notification message indicating that the reply message should be deleted.

2. The method of claim 1, wherein the requester computing device disconnects from the first one of the plurality of messaging manager systems when the connection fails between the requester computing device and the first one of the plurality of messaging manager systems.

3. The method of claim 1, wherein the notification message comprises a name of the replicated message queue to which the reply message was sent and the unique identifier of the consumed reply message.

4. The method of claim 1, wherein the request message is created with a reply-to destination as a replicated queue and the method further comprises saving the unique message identifier of the request message.

5. The method of claim 1, wherein before creating the request message, the computing device is workload balanced to the first one of the plurality of messaging manager systems.

6. The method of claim 1, further comprising:
   disconnecting third one of the plurality of messaging manager systems after receiving the reply message from the one of the plurality of replicated message queues.

7. A computing device for message delivery in messaging networks, comprising:
   at least one processor, and
   a non-transitory computer-readable medium coupled with the at least one processor, the computer-readable storage medium having computer readable program code stored thereon that when executed by the at least one processor it causes the computing device to perform operations comprising:
   creating a request message comprising a unique message identifier;
   sending via a first one of a plurality of messaging manager systems, the request message to a second one of the plurality of messaging manager systems;
   disconnecting from the first one of the plurality of messaging manager systems;
   wherein, in response to receiving the request message, a reply message comprising the unique message identifier is created by the second one of the plurality of messaging manager systems and is published to each of a plurality of replicated message queues, the reply message to be received by the requester computing device from any one of the plurality of replicated message queues;
   connecting to a third one of the plurality of messaging manager systems;
   specifying the unique message identifier of the request message to receive the reply message; and
   receiving the reply message from one of the plurality of replicated message queues;
   wherein after the reply message is received by the requester computing device, the reply message is deleted from each of the plurality of replicated message queues, other than the one of the plurality of replicated message queues, based on receiving a notification message indicating that the reply message should be deleted.

8. The computing device of claim 7, wherein the computing device disconnects from the first one of the plurality of messaging manager systems when the connection fails between the computing device and the first one of the plurality of messaging manager systems.

9. The computing device of claim 7, wherein the notification message comprises a name of the replicated message queue to which the reply message was sent and the unique identifier of the consumed reply message.

10. The computing device of claim 7, wherein the request message is created with a reply-to destination as a replicated queue and the method further comprises saving the unique message identifier of the request message.

11. The computing device of claim 7, wherein before creating the request message, the computing device is workload balanced to the first one of the plurality of messaging manager systems.

12. The computing device of claim 7, further comprising:
disconnecting third one of the plurality of messaging manager systems after receiving the reply message from the one of the plurality of replicated message queues.

13. A non-transitory computer-readable storage medium having computer readable program code stored thereon that when executed by at least one processor causes a computing device to perform operations comprising:
creating a request message comprising a unique message identifier,
sending via a first one of a plurality of messaging manager systems, the request message to a second one of the plurality of messaging manager systems;
disconnecting from the first one of the plurality of messaging manager systems;
wherein, in response to receiving the request message, a reply message comprising the unique message identifier is created by the second one of the plurality of messaging manager systems and is published to each of a plurality of replicated message queues, the reply message to be received by the requester computing device from any one of the plurality of replicated message queues;
connecting to a third one of the plurality of messaging manager systems;
specifying the unique message identifier of the request message to receive the reply message; and
receiving the reply message from one of the plurality of replicated message queues;
wherein after the reply message is received by the requester computing device, the reply message is deleted from each of the plurality of replicated message queues, other than the one of the plurality of replicated message queues, based on receiving a notification message indicating that the reply message should be deleted.

14. The non-transitory computer-readable storage medium of claim 13, wherein the computing device disconnects from the first one of the plurality of messaging manager systems when the connection fails between the computing device and the first one of the plurality of messaging manager systems.

15. The non-transitory computer-readable storage medium of claim 13, wherein the notification message comprises a name of the replicated message queue to which the reply message was sent and the unique identifier of the consumed reply message.

16. The non-transitory computer-readable storage medium of claim 13, wherein the request message is created with a reply-to destination as a replicated queue and the method further comprises saving the unique message identifier of the request message.

17. The non-transitory computer-readable storage medium of claim 13, wherein before creating the request message, the computing device is workload balanced to the first one of the plurality of messaging manager systems.

* * * * *